US011293772B2

(12) United States Patent
Tatsumi (10) Patent No.: US 11,293,772 B2
(45) Date of Patent: Apr. 5, 2022

(54) TRAVELING PATH PROVIDING SYSTEM, METHOD OF CONTROLLING SAME, AND NON-TRANSITORY COMPUTER READABLE MEDIUM

(71) Applicant: HONDA MOTOR CO., LTD., Tokyo (JP)

(72) Inventor: Hiroshi Tatsumi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 180 days.

(21) Appl. No.: 16/575,984

(22) Filed: Sep. 19, 2019

(65) Prior Publication Data

US 2020/0011689 A1    Jan. 9, 2020

Related U.S. Application Data

(63) Continuation of application No. PCT/JP2017/013503, filed on Mar. 31, 2017.

(51) Int. Cl.
*G01C 21/34* (2006.01)
*G01C 21/36* (2006.01)

(52) U.S. Cl.
CPC ..... *G01C 21/3484* (2013.01); *G01C 21/3667* (2013.01)

(58) Field of Classification Search
CPC ............ G01C 21/3484; G01C 21/3667; G01C 21/3641; G01C 21/3602; G01C 21/32; G08G 1/00; G08G 1/16
See application file for complete search history.

(56) References Cited

U.S. PATENT DOCUMENTS

| | | | | |
|---|---|---|---|---|
| 2012/0191343 A1* | 7/2012 | Haleem | ............... | G01C 21/3461 |
| | | | | 701/431 |
| 2012/0197522 A1* | 8/2012 | Fukuhara | ........... | G01C 21/3484 |
| | | | | 701/424 |
| 2014/0088815 A1* | 3/2014 | Kitagishi | .......... | B60W 50/0098 |
| | | | | 701/29.1 |

(Continued)

FOREIGN PATENT DOCUMENTS

| CN | 104019808 A | 9/2014 |
|---|---|---|
| CN | 104331953 A | 2/2015 |

(Continued)

OTHER PUBLICATIONS

International Search Report for PCT/JP2017/013503 dated Jun. 6, 2017 (partially translated).

(Continued)

*Primary Examiner* — Rami Khatib
(74) *Attorney, Agent, or Firm* — Thomas | Horstemeyer, LLP (57) ABSTRACT

A traveling path providing system comprises: a determining unit that determines the driving skill of a driver of a vehicle, based on a driving history of the driver; an acquiring unit that acquires surroundings information including information of a road surface on which the vehicle is currently traveling; a specifying unit that specifies at least one path travelable by the driver on the road surface, based on the surroundings information and the determined driving skill; and a providing unit that provides the at least one path specified by the specifying unit.

12 Claims, 4 Drawing Sheets

(56) References Cited

U.S. PATENT DOCUMENTS

| | | | |
|---|---|---|---|
| 2016/0084661 A1 | 3/2016 | Gautama et al. | |
| 2017/0016737 A1* | 1/2017 | Takahara | G08G 1/096855 |
| 2017/0305349 A1* | 10/2017 | Naboulsi | B60R 1/025 |
| 2017/0343374 A1 | 11/2017 | Yi et al. | |
| 2018/0164108 A1* | 6/2018 | Rahal-Arabi | G01C 21/3484 |
| 2020/0284601 A1* | 9/2020 | Myers | G01C 21/3484 |

FOREIGN PATENT DOCUMENTS

| | | |
|---|---|---|
| CN | 105523042 A | 4/2016 |
| CN | 106092121 A | 11/2016 |
| EP | 3048025 A1 | 7/2016 |
| JP | H08-313284 A | 11/1996 |
| JP | H10-325733 A | 12/1998 |
| JP | 2010-14557 A | 1/2010 |
| JP | 2011-34128 A | 2/2011 |
| JP | 2015-169612 A | 9/2015 |
| JP | 2015-200511 A | 11/2015 |
| JP | 2016-134173 A | 7/2016 |
| WO | 2018/179305 A1 | 10/2018 |

OTHER PUBLICATIONS

Chinese Office Action for Chinese Patent Application No. 201780088871.5 dated May 21, 2021.
Indian Office Action for Indian Patent Application No. 201947041870 dated Jul. 6, 2021.
IPRP for PCT/JP2017/013503 dated May 22, 2018.
Chinese Office Action for Chines Patent Application No. 201780088871.5 dated Nov. 3, 2021.

* cited by examiner

TRAVELING PATH PROVIDING SYSTEM, METHOD OF CONTROLLING SAME, AND NON-TRANSITORY COMPUTER READABLE MEDIUM

CROSS-REFERENCE TO RELATED APPLICATION

This application is a continuation of International Patent Application No. PCT/JP2017/013503 filed on Mar. 31, 2017, the entire disclosures of which is incorporated herein by reference.

TECHNICAL FIELD

The present invention relates to a traveling path providing system, a method of controlling the same, and a non-transitory computer readable medium.

BACKGROUND ART

Conventionally, there is a driving support system that provides a driver with an ideal line for driving (traveling path), based on the position of the vehicle and vehicle information (PTL 1, etc.).

CITATION LIST

Patent Literature

PTL1: Japanese Patent Laid-Open No. 2016-134173

SUMMARY OF THE INVENTION

Technical Problem

However, as described in PTL 1, line support suited to the actual driver and the road surface conditions cannot be provided with just the position of the vehicle and vehicle information. The technology of PTL 1 cannot provide an ideal line unless the vehicle is, for example, on a road in a developed urban area or in an environment for which information regarding roads is preliminarily provided through map data. Specifically, one way of enjoying a motorcycle and the like is to freely travel through undeveloped areas and the like. In such a situation, PTL 1 cannot provide an appropriate path.

Thus, the present invention takes into consideration the driving skill of the driver and the actual surrounding conditions, and an object thereof is to provide driving support suitable for the driver.

Solution to Problem

According to one aspect of the preset invention, there is provided a traveling path providing system comprising: a determining unit configured to determine the driving skill of a driver of a vehicle, based on a driving history of the driver; an acquiring unit configured to acquire surroundings information including information of a road surface on which the vehicle is currently traveling; a specifying unit configured to specify at least one path travelable by the driver on the road surface, based on the surroundings information and the determined driving skill; and a providing unit configured to provide the at least one path specified by the specifying unit.

According to another aspect of the present invention, there is provided a method of controlling a traveling path providing system, comprising: determining driving skill of a driver of a vehicle, based on driving history of the driver; acquiring surroundings information including information of a road surface on which the vehicle is currently traveling; specifying at least one path travelable by the driver on the road surface, based on the surroundings information and the determined driving skill; and providing the at least one path specified in the specifying.

According to another aspect of the present invention, there is provided a non-transitory computer readable medium storing a program for causing a computer to function to: determine the driving skill of a driver of a vehicle, based on driving history of the driver; acquire surroundings information including information of a road surface on which the vehicle is currently traveling; specify at least one path travelable by the driver on the road surface, based on the surroundings information and the determined driving skill; and provide the at least one path specified.

Advantageous Effects of Invention

According to the present invention, it is possible to provide driving support adapted to a driver.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings are included in, and form a portion of, the specification and are used to illustrate embodiments of the invention and to explain the principles of the invention together with a description thereof.

DESCRIPTION OF EMBODIMENTS

An embodiment of the present invention will be described below with reference to the drawings. Note that the configuration, etc., described below are mere examples, and are not limited thereto.

First Embodiment

[Hardware Configuration]

Figure 1:
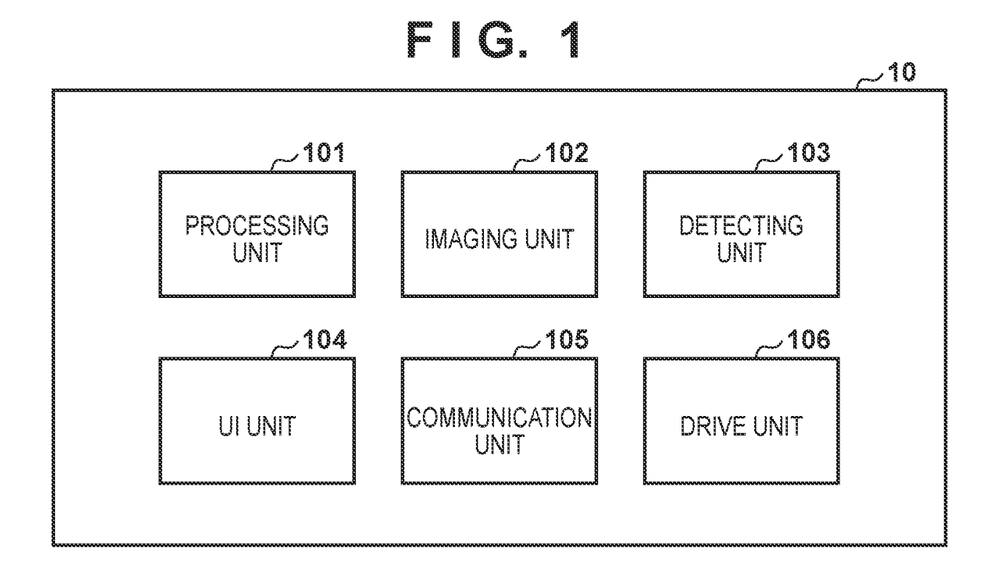
FIG. 1 illustrates an example hardware of a configuration of a vehicle according to the present invention.

FIG. 1 illustrates an example of a hardware configuration of a vehicle 10 according to the present invention. In this embodiment, a motorcycle is described as an example of the vehicle 10, but the example is not limited thereto.

The vehicle 10 includes a processing unit 101, an imaging unit 102, a detecting unit 103, a UI unit 104, a communication unit 105, and a drive unit 106.

The processing unit 101 comprehensively controls the processing according to this embodiment. Although not illustrated in FIG. 1, the processing unit 101 includes a storage area for storing various programs and data, and realizes processing and the like according to the present invention by reading and executing the programs. As described above, in this embodiment, a motorcycle is described as an example of the vehicle 10, but the control of traveling, etc., of the motorcycle may be configured separately from the processing carried out by the processing unit 101.

The imaging unit 102 is an imaging means for capturing an image of the surroundings of the vehicle (hereinafter referred to as "surroundings image"), and, for example, is a 360-degree camera, a wide-angle camera, or the like. Note that multiple imaging units 102 may be provided to capture images in all directions of the vehicle 10. Multiple imaging units 102 are not necessarily limited to those of the same type (function), and may be changed according to the image capturing direction and position. Examples of pieces of information acquired as surroundings images include the road surface condition, brightness, presence of objects in forward, rearward, lateral, and upward directions, etc.

The detecting unit 103 is a detecting means (sensor) that is provided in the vehicle 10 according to this embodiment and detects various operations, and may be of any type. Examples of the detecting unit 103 include sensors for detecting tilting of the vehicle 10, the fuel level, the degree of operation of the accelerator and the brake, acceleration, etc. Various types of information regarding the surrounding environment may be detected. This information includes the road surface condition, weather, brightness, temperature, humidity, obstacles, etc. Note that the range and accuracy of detection by the detecting unit 103 may be changed according to the characteristics thereof and the information to be acquired. Furthermore, biological information regarding an operator during driving may be acquired. Examples of biological information include, for example, heart rate, body temperature, perspiration, respiration, etc.

The UI unit 104 provides information (such as display, audio output, etc.,) to the operator of the vehicle 10 or accepts input (button input, audio input, etc.,) made by the operator.

The communication unit 105 is a component that performs wireless communication with an external device. Note that the type of data to be transmitted and received and the transmission method are not limited. The communication unit 105 may include a communication means that corresponds to a GPS (Global Positioning System) for acquiring positional information regarding the vehicle 10. In such a case, the communication unit 105 acquires various types of positional information from the GPS according to the position of the vehicle 10.

The drive unit 106 is a component that controls driving and operations regarding traveling of the vehicle and the like. Note that the drive unit 106 includes a component concerning the operation of the handlebar, the brake, etc.

Note that, in this embodiment, the vehicle 10 is described as having a configuration including the processing unit 101, the imaging unit 102, the UI unit 104, and the communication unit 105, but is not limited thereto. For example, these functions may be realized by using in-vehicle devices (such as a car navigation system), a portable terminal such as a smart phone, and the like. The UI unit 104 may be a display mounted on a helmet, or a projecting device, such as a projector. That is, the UI unit 104 is configured to visually provide various types of information to the operator. Furthermore, the UI unit 104 may include an audio output means such as a speaker. In such a case, the UI unit 104 may be configured to provide various types of information through sound to the operator. Visual and auditory information may be provided in combination.

The configuration (combination) of the imaging unit 102 and the detecting unit 103 may be changed in order to reduce the processing load and the volume of communication data in the vehicle 10.

[Software Configuration]

Figure 2:
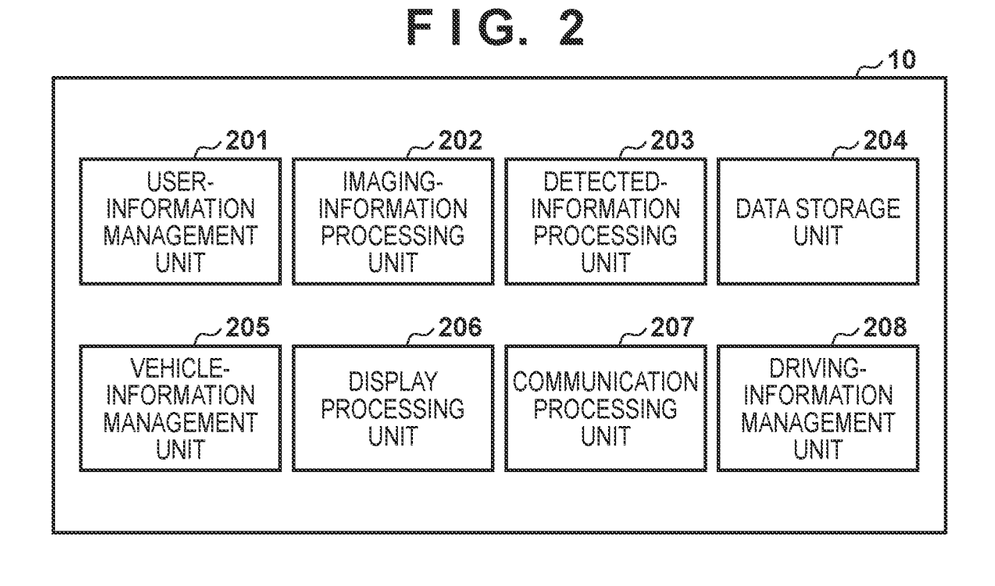
FIG. 2 illustrates an example of a software configuration of a vehicle according to the present invention.

FIG. 2 illustrates an example of a software configuration of the vehicle 10 according to the present invention. The vehicle 10 includes a user-information management unit 201, an imaging-information processing unit 202, a detected-information processing unit 203, a data storage unit 204, a vehicle-information management unit 205, a display processing unit 206, a communication processing unit 207, and a driving-information management unit 208.

The user-information management unit 201 manages information regarding the operator of the vehicle 10. Here, examples of pieces of user information include body information (weight, height, sex, age, etc.) and operation history (riding period, frequency, etc.). The user-information management unit 201 may also manage the later-described operational level of the user.

The imaging-information processing unit 202 executes processing for storing data of a surroundings image captured by the imaging unit 102, and converts the format of the image for transmission to an external device. The surroundings image may be processed to extract characteristic points and delete information excluding the characteristic points. Here, the characteristic points may include information regarding the position and shape of an object residing in an actual space and the distance between the object and the vehicle.

The detected-information processing unit 203 processes various types of information detected by the detecting unit 103. For example, the detected-information processing unit 203 executes processing for storing data of the detected information, and outputs signals for notifying the operator and performing drive control when a result detected by the detecting unit 103 exceeds a predetermined threshold. Furthermore, the detected-information processing unit 203 estimates the operational level of the operator based on information detected by the detecting unit 103 and data stored in the data storage unit 204.

The data storage unit 204 stores and accumulates various types of information acquired by the imaging-information processing unit 202 and the detected-information processing unit 203. The data storage unit 204 may also store information acquired by the communication unit 105 from an external device. Path patterns for specifying and calculating a later-described traveling path (traveling route) may be stored therein advance.

The vehicle-information management unit 205 manages information regarding the vehicle 10. The vehicle information may include, for example, identification information for uniquely identifying a vehicle, unique information, such as vehicle model and performance, as well as maintenance history, etc.

The display processing unit 206 executes processing for displaying the content to be notified to the operator based on the detected information, etc., via the UI unit 104. The display processing unit 206 also specifies and presents paths travelable by a later-described operator, based on various types of information. Details of a display example according to the embodiment will be described below.

The communication processing unit 207 executes processing for sending the various types of information stored in the vehicle to an external device via the communication unit 105. Furthermore, the communication processing unit 207 executes processing for acquiring various types of information from an external device. Examples of information acquired from an external device include positional information, weather information, etc. Furthermore, the communication processing unit 207, depending on its position, may acquire the latest image information regarding its surroundings and surroundings information. Examples of information to be sent an external device include path information regarding the paths traveled by the vehicle (or operator). Here, an external device is a server on a network, another vehicle (motorcycle), or the like.

The driving-information management unit 208 manages information regarding driving history of the vehicle 10 by an operator. Here, the driving history includes operation history of the accelerator, the brake, etc., operation of the handlebar, and tilting of the vehicle, posture during traveling, increase/decrease of speed (acceleration, deceleration), continuous riding time, etc. Note that the driving information may be associated with information regarding the operator (user information) and updated in a timely manner.

[Process]

A process for the vehicle according to this embodiment will now be described with reference to FIG. 3. This process is realized by the processing unit 101 of the vehicle 10 reading and executing a program stored in a storage unit (not illustrated).

In step S301, the processing unit 101 acquires surroundings images captured by the imaging unit 102 and surroundings information detected by the detecting unit 103. Note that the timings of acquiring the images and information do not necessarily have to be the same, and the images and information may be acquired, for example, at predefined intervals.

In step S302, the processing unit 101 acquires operational information regarding the vehicle 10 and user information. The information acquired here includes current information (the condition of the vehicle and the biological information regarding the user), as well as predetermined information.

In step S303, the processing unit 101 specifies candidates of paths travelable by the vehicle 10 from the surrounding region, based on the surrounding images and the surroundings information. At this time, the processing unit 101 may also specify paths (regions) not travelable (that are dangerous). Here, the specifying step uses the shape, unevenness, sloping, and wetness of the surroundings, the position and size of an obstacle, the positional relation with the obstacle, etc.

In step S304, the processing unit 101 estimates the operational level of the operator based on the operational information and the user information. The operational level here is determined based on the operational skill (driving skill) of the user, as well as the maintenance condition, fuel level, etc., of the vehicle. Note that the operational level is predefined in multiple stages, and thresholds are set for the respective stages. The operational level may be estimated in accordance with a value calculated based on operation history, etc. For calculating the value, each item may be weighted, or only specific items may be used depending on the condition under which the vehicle is being operated. Note that, when the operational level is to be estimated, a portion of the information (for example, the operation history, the tendency of operation, etc.) may be preliminarily processed and specified (calculated), and only information (biological information, etc.) acquired during operation may be added during the operation to estimate the operational level. In this way, it is possible to reduce the processing load during operation.

In step S305, the processing unit 101 specifies paths that are suitable for the operational level estimated in step S304, from among the candidate paths estimated in step S303. In this specifying step, at least one path that corresponds to the estimated operational level is extracted based on a predefined criterion.

In step S306, the processing unit 101 displays the paths specified in step S304 on the UI unit 104. Here, the display modes may include indicating a specified path with a marker, such as an arrow or the like, or displaying a prescribed image object (ghost) leading the path. The display mode (colors, etc.) of the travelable paths may be switched in accordance with the respective levels, and warnings may be displayed for highly dangerous paths (regions). The display modes may include a two-dimensional display (such as a projection on a road surface), or a three-dimensional display (such as a three-dimensional ghost display). The displayed content is updated in a timely manner in response to an operation or the like (for example, a braking operation, an accelerating operation, and the turning direction of the handlebar) during display.

After performing the processing of step S306, the process returns to step S301 to repeat the processing. The paths may continue to be displayed even after the vehicle stops. For example, the process may end in response to the engine stopping, a predetermined instruction (stop instruction via a button), or the like.

[Display Example]

Figure 4:
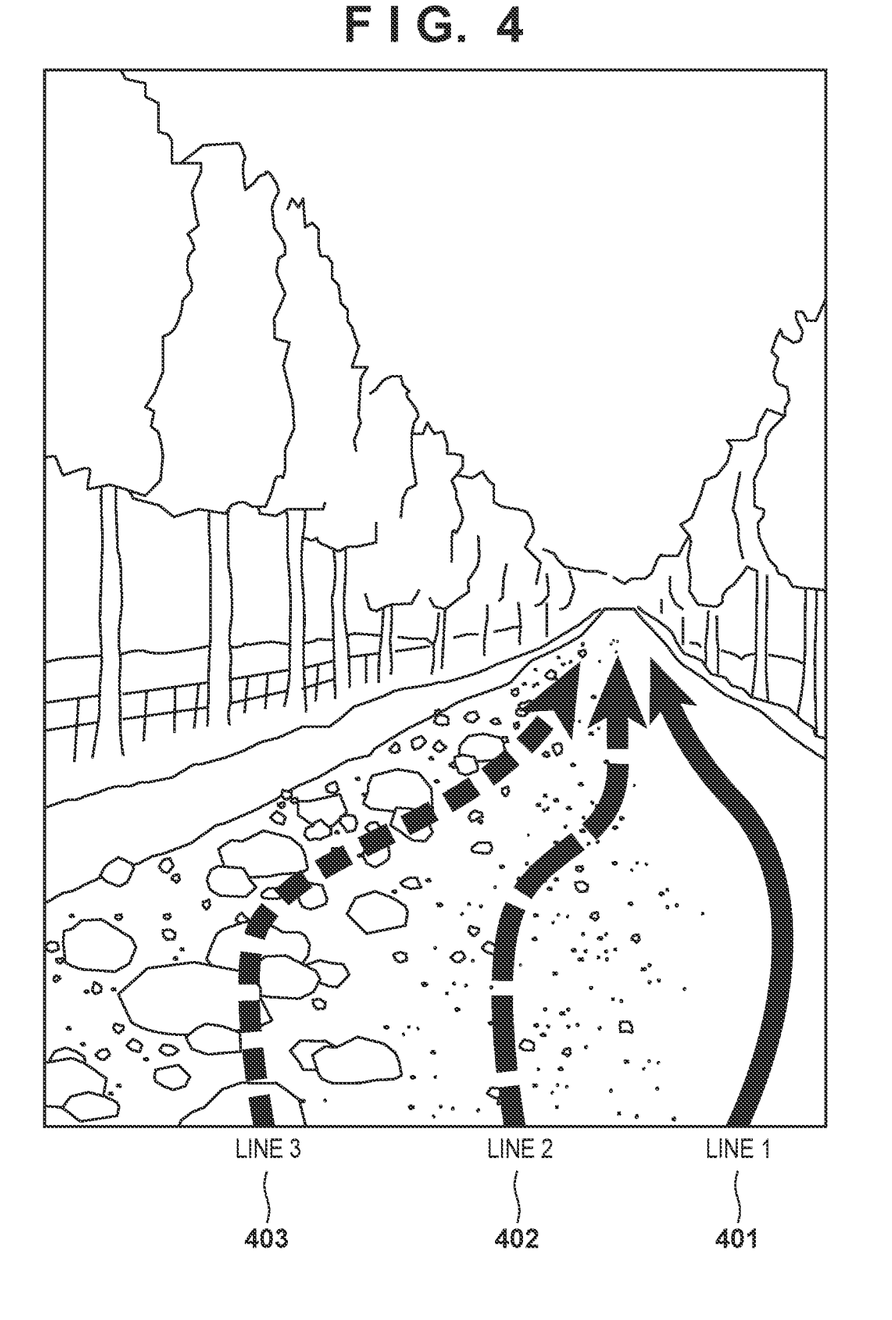
FIG. 4 illustrates an example of a path display according to the present invention.

A display example according this embodiment will be described. FIG. 4 illustrates a display example of paths according to this embodiment in view of the operator of the vehicle. In FIG. 4, three paths are indicated by arrows 401, 402, and 403, and the display modes of the paths are switched in accordance with the respective levels. Line 1 indicated by arrow 401 illustrates a traveling path having the lowest level (easiest). Line 2 indicated by arrow 402 illustrates a traveling path having an intermediate level. Line 3 indicated by arrow 403 illustrates a traveling path having the highest level (most difficult) among the three paths. Here, the paths illustrated by the respective lines correspond to the operational level of the operator. Note that paths significantly exceeding the operational level may not be displayed, or lines that slightly exceed the operational level may be displayed with the aim of improving the operational skill. The display setting of the traveling path, and the difficulty setting to be displayed may be set by the operator.

Here, only lines are displayed, but it is possible to display a leading (preceding) display object or a ghost may be displayed on a line or the vicinity of the line. Whether a ghost is to be displayed may be set by the operator. The operator may also be able to set the shape and type of the ghost (for example, a specific character) to be displayed. The (visible) distance between the vehicle (operator) and the ghost may be constant, or may be changed in accordance with the traveling speed and the selected line.

[Specifying Paths]

Steps S303 and S305 in FIG. 3 of specifying candidate paths and specifying a path corresponding to the operational level of the user will be further explained below. The candidate paths extending in the vicinity of the traveling vehicle 10 in the traveling direction can be specified based on prescribed path patterns. For example, path patterns for specifying spaces that are available as paths are defined, for example, in regard to the turning direction of the handlebar, the current speed, acceleration, tilting of the vehicle, posture, the condition of the road surface, and the presence of an obstacle in the front, left, and right directions. Then, paths to be candidates in the real space are extracted based on respective indexes.

The predefined path patterns are stored in association with operational levels. For example, a path in the real space may be specified in accordance with a path pattern corresponding to a certain operational level. Even for the same path, the level may be set to vary depending on the conditions, such as a sloping terrain and unevenness of the ground or the like in the real space.

If, during traveling, a high-difficulty line is successfully travelled, the next path to be presented may be updated in a timely manner to provide a line having higher difficulty.

A tendency in the selection of paths (lines) may be used as history. By using such a tendency, the preference in path selection by the operator may be estimated so as to provide a path that better matches the preference. In such a case, the specification of a path based on difficulty and the specification of a path based on preference (tendency) may be respectively weighted, to provide a path in accordance with the weighted results.

[Operational Level]

Figure 3:
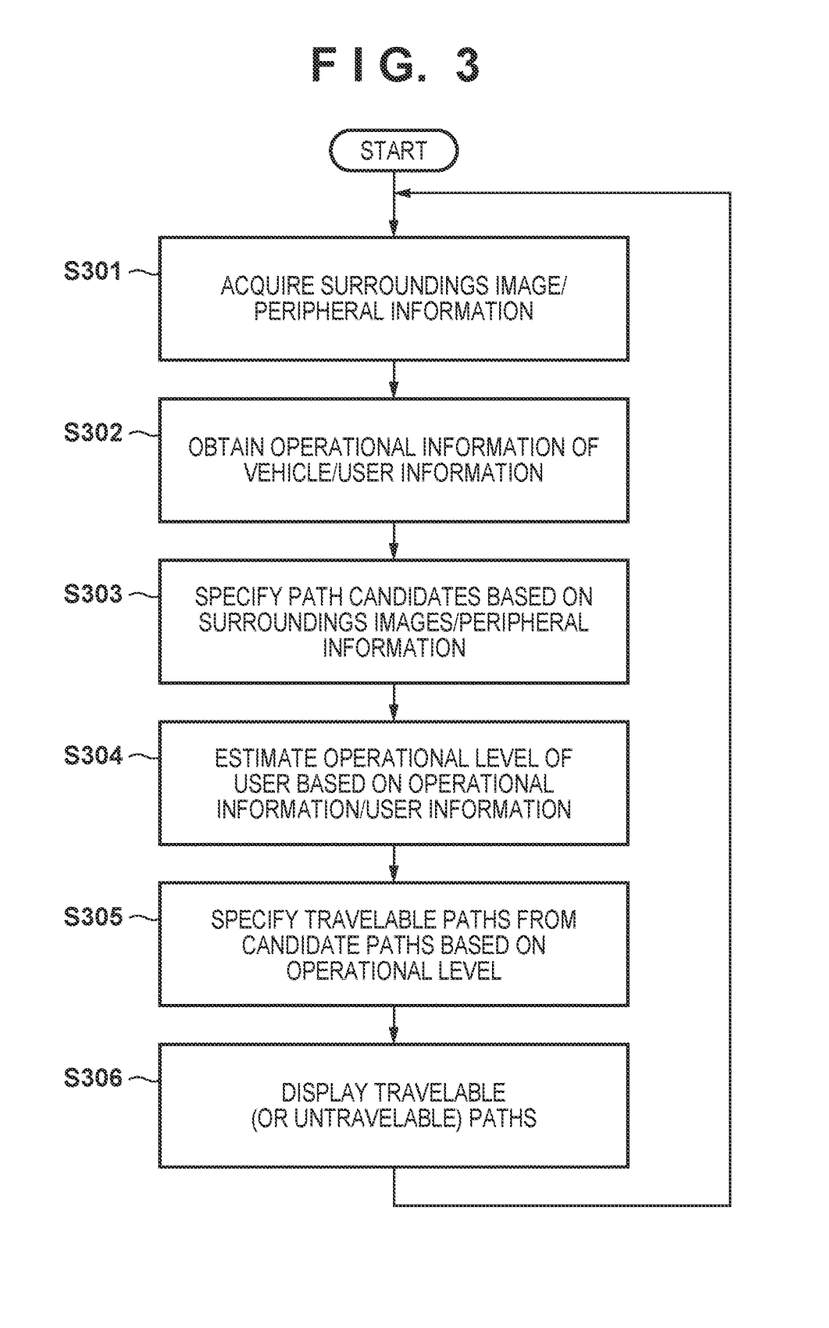
FIG. 3 is a flowchart illustrating a process performed in a vehicle according to the present invention.

Step S304 in FIG. 3 of estimating an operational level will be further explained. The vehicle 10 may store the past results of estimations of the operational level of the operator, and use the information regarding a previous estimation for a current operation. The difference between the previous operational level and the current operational level may be determined. As indexes of the operational level, it is possible to use operation timings of the accelerator and the brake, frequency of gear shift, control of acceleration/deceleration, tilting of the vehicle, shift of the center of gravity, etc. Furthermore, information regarding whether the provided path has been appropriately traveled and the like may be used from past operation history. Each time it is determined that the skill (operational level) has increased (or decreased) as a result of a comparison between an estimated result of the past of the current estimated result, the criterion of a travelable path may be switched.

The properties of the ghost may also be changed in accordance with the operational level. For example, the displayed position (inter-vehicular distance) of the ghost and the displayed operation of the ghost (tilting of vehicle and posture) may be changed in accordance with the operational level.

Even when there is no change in the operational level itself, adjustments may be made in accordance with current conditions (biological information).

As described above, this embodiment takes into consideration the driving skill of the driver and the actual surrounding conditions, and a traveling path suitable for the driver can be provided.

OTHER EMBODIMENTS

In the example described above, the vehicle specifies a path and estimates the operational level, but this configuration is not limited thereto. For example, in the traveling path providing system according to the present invention, at least one vehicle is communicably connected to an external device or server (not illustrated), and information acquired on the vehicle side is sequentially sent to the server side. Then, the server side may execute processing for providing information regarding the path to the traveling vehicle. That is to say, the server side may execute a portion of the process illustrated in FIG. 3 to notify the vehicle every time the processing is executed. In such a case, the server includes some of the components illustrated in FIG. 2. The component that executes the processing may be switched in consideration of the communication speed between the external device and the vehicle, the volume of data to be transmitted and received, the processing load, etc. Note that, a computer, which is a typical information processing unit, may be used as the server.

In FIG. 4, only multiple traveling paths (lines) are displayed, but there is no limit thereto. For example, travel history information regarding other vehicles may be used to provide information regarding areas that are dangerous to travel (for example, areas where the motorcycle is likely to fall over). When a potential obstacle (object) is recognized near the head of the operator based on a captured image or a detected result by the detecting unit, in addition to the ground surface, information regarding the obstacle may be provided.

Figure 5:
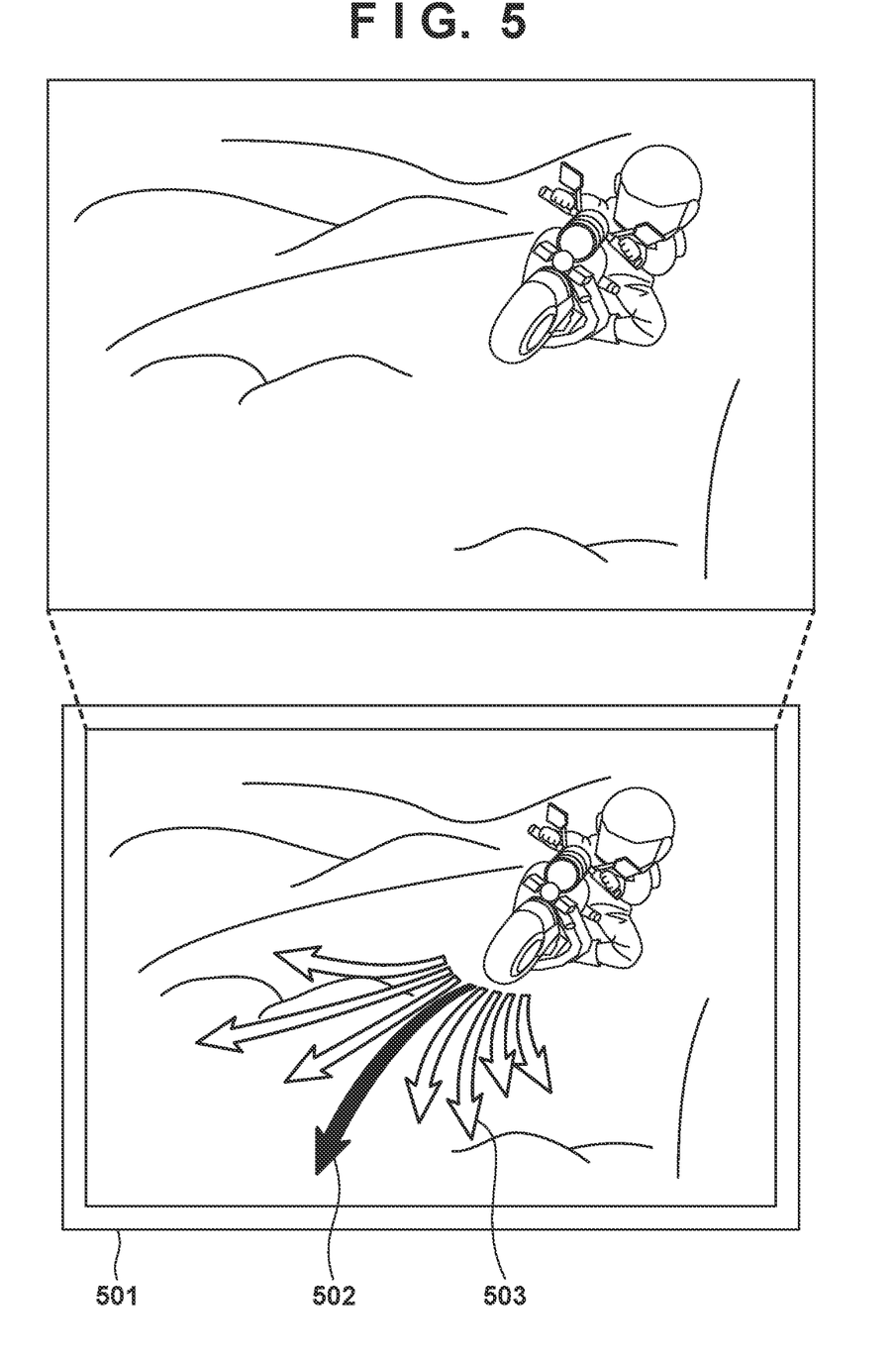
FIG. 5 illustrates an example of a path display according to the present invention.

The server may send path information to a device other than the vehicle, and this device may display possible paths (candidates) for the vehicle to travel. For example, FIG. 5 illustrates a display example on a display of a terminal device 501 in a case where path information is referred to from a position different from the perspective of the operator on the vehicle. FIG. 5 illustrates multiple traveling directions (arrows 502 and 503) of the vehicle, and here, it is indicated that traveling in the direction of the middle arrow 502 (in a straight direction) is highly likely. At this time, the path assumed to be traveled can be specified based on, for example, the line of sight of the operator, the turning direction of the handlebar, etc., as well as the specified path information. For the display here, the terminal device 501 itself may include an imaging unit, such as a camera, and the path information may be superposed on an image captured by this imaging unit. More specifically, the positional relationship between (relative positions of) the terminal device 501 and the vehicle is specified based on the positional information regarding the terminal device and the positional information regarding the vehicle; at least one path specified to be travelable by the vehicle is converted based on the positional relations of the devices and provided to the terminal device 501. Furthermore, the vehicle included in the image displayed by the terminal device 501 and the converted information regarding the path are associated with each other and superposed for display. It is possible to use conventional AR (Augmented Reality) technology for the superposed display.

An example of other information acquired by the vehicle described above is map information. However, in some cases, it might not be possible to acquire the map information depending on circumstances, or there might be a difference in the actual surroundings information and the map information (for example, in a case of a disaster). In such a case, the actual information acquired by the detecting unit and the imaging unit may be used with priority over the map information. Two-dimensional or three-dimensional map data may be created from actual travel history and updated accordingly, to specify a new path using the updated information. Note that, to create three-dimensional map data, longitude/latitude/altitude as well as information on unevenness and curves in the traveled paths may be also recorded, and this data may be reflected in the map data.

A path in an area not detected by the imaging unit and the detecting unit of the vehicle may be calculated based on travel history of other vehicles obtained within a predetermined range. In such a case as well, travel history of operators having an operational level similar to the operational level of the operator of the vehicle may be used. Furthermore, the level of fuel consumption from the present time onward be calculated based on the difference in height, condition, and the weather, etc., of the traveling path. In this way, fuel consumption or the like due to operations made by the operator when travelling on the path can be estimated, and this information can be provided to the operator.

By providing the path actually traveled, information regarding paths other than developed areas (such as roads in urban areas) can be shared, and it is possible to enhance techniques, for example, among users of the same level.

In the example described above, a motorcycle is described as an example of the vehicle, but the present invention may be applied to any vehicle to which the above-described components can be mounted (loaded), such as an automobile or a bicycle, for example.

The above-described processing is explained to be realized by the processing unit reading and executing a program, but the processing is not limited thereto. For example, the processing may be realized by using a dedicated circuit, or may be integrated with a processing unit for vehicle control.

SUMMARY OF EMBODIMENTS

1. A traveling path providing system (for example, 10) according to an above-described embodiment is characterized by including:

determining means (for example, 101 and 203) for determining a driving skill of a driver of a vehicle, based on a driving history of the driver;

acquiring means (for example, 103) for acquiring surroundings information regarding the vehicle;

specifying means (for example, 101 and 206) for specifying at least one path travelable by the driver, based on the surroundings information and the determined driving skill; and providing means (for example, 104 and 206) for providing the at least one path specified by the specifying means.

According to this embodiment, it is possible to provide driving support more adapted to the driver.

2. The traveling path providing system according to the above-described embodiment is characterized in that the providing means provides the driver the at least one path specified by the specifying means, through a visual method.

According to this embodiment, the driver can visually recognize a candidate path.

3. The traveling path providing system according to the above-described embodiment is characterized by further including:

accumulating means (for example, 208) for accumulating path information regarding paths traveled by a plurality of vehicles; and means (for example, 204 and 207) for sharing the accumulated path information among a plurality of drivers.

According to this embodiment, it is possible to share the path information among many drivers.

4. The traveling path providing system according to the above-described embodiment is characterized in that the specifying means specifies a new path based on the accumulated path information.

According to this embodiment, it is possible to acquire new path information as more data is accumulated.

5. The traveling path providing system according to the above-described embodiment is characterized by further including creating means for creating three-dimensional map data using the accumulated path information.

According to this embodiment, it is possible to acquire more detailed path information in a three-dimensional form.

6. The traveling path providing system according to the above-described embodiment is characterized by further including means (for example, 103) for acquiring biological information regarding the driver while driving the vehicle, wherein the specifying means further specifies at least one path based on the biological information.

According to this embodiment, it is possible to provide information on a path adapted to the condition of the driver during driving (for example, information in consideration of the physical condition of the driver).

7. The traveling path providing system according to the above-described embodiment is characterized in that the specifying means further specifies at least one path travelable by the driver based on vehicle information.

According to this embodiment, it is possible to provide information on a path adapted to the condition and model of the vehicle being operated.

8. The traveling path providing system according to the above-described embodiment is characterized in that the providing means switches a display method of the at least one path specified by the specifying means in accordance with the driving skill.

According to this embodiment, it is possible to provide information on an appropriate path suitable for the driver.

9. The traveling path providing system according to the above-described embodiment is characterized in that the providing means displays a ghost when the at least one path specified by the specifying means is provided.

According to this embodiment, the driver can more intuitively recognize a candidate path.

10. The traveling path providing system according to the above-described embodiment is characterized in that, in the traveling path providing system, the vehicle and an information processing device are communicably connected, the vehicle includes the acquiring means and the providing means, and the information processing device includes the determining means and the specifying means.

According to this embodiment, processing can be distributed through cooperation between the multiple devices.

11. A method of controlling a traveling path providing system according to the above-described embodiment, characterized by including:

a determining step of determining a driving skill of a driver of a vehicle, based on driving history of the driver;

an acquiring step of acquiring surroundings information regarding the vehicle;

a specifying step of specifying at least one path travelable by the driver, based on the surroundings information and the determined driving skill; and a providing step of providing the at least one path specified by the specifying means.

According to this embodiment, it is possible to provide driving support more adapted to the driver.

12. A program according to the above-described embodiment instructs a computer to function as:

determining means for determining the driving skill of a driver of a vehicle, based on driving history of the driver;

acquiring means for acquiring surroundings information regarding the vehicle;

specifying means for specifying at least one path travelable by the driver, based on the surroundings information and the determined driving skill; and providing means for providing the at least one path specified by the specifying means.

According to this embodiment, it is possible to provide driving support more adapted to the driver.

The present invention is not limited to the above embodiments and various changes and modifications can be made within the spirit and scope of the present invention. Therefore, to apprise the public of the scope of the present invention, the following claims are made.

The invention claimed is:

1. A traveling path providing system comprising:
   at least one processor circuit with a memory comprising instructions, that when executed by the processor circuit, causes the at least one processor circuit to at least:
   determine the driving skill of a driver of a vehicle, based on a driving history of the driver;
   acquire surroundings information including information of a road surface of a route on which the vehicle is currently traveling;
   specify a plurality of paths each having different difficulty travelable by the driver on the road surface of the route, based on the surroundings information and the determined driving skill; and
   provide the plurality of paths each having different difficulty specified in the specifying by superposing the surroundings information in a view of the driver.

2. The traveling path providing system according to claim 1, wherein the instructions further cause the at least one processor circuit to at least provide the driver by displaying to superpose the plurality of paths each having different difficulty specified in the specifying on the road surface of the route, through a visual method.

3. The traveling path providing system according to claim 1, wherein the instructions further cause the at least one processor circuit to at least:
   accumulate path information regarding paths traveled by a plurality of vehicles; and
   share the accumulated path information among a plurality of drivers.

4. The traveling path providing system according to claim 3, wherein the instructions further cause the at least one processor circuit to at least specify a new path based on the accumulated path information.

5. The traveling path providing system according to claim 3, wherein the instructions further cause the at least one processor circuit to at least
   create a three-dimensional map data using the accumulated path information.

6. The traveling path providing system according to claim 1, wherein the instructions further cause the at least one processor circuit to at least:
   acquire biological information regarding the driver while driving the vehicle, and
   wherein the instructions cause the at least one processor circuit to further specify the plurality of paths each having different difficulty travelable by the driver on the road surface of the route based on the biological information.

7. The traveling path providing system according to claim 1, wherein the instructions cause the at least one processor circuit to further specify the plurality of paths each having different difficulty travelable by the driver on the road surface of the route based on vehicle information.

8. The traveling path providing system according to claim 1, wherein the instructions cause the at least one processor circuit to switch a method in which the plurality of paths each having different difficulty specified in the specifying is displayed in accordance with the driving skill.

9. The traveling path providing system according to claim 1, wherein the instructions cause the at least one processor circuit to display different image objects to lead the plurality of paths each having different difficulty when the plurality of paths each having different difficulty specified in the specifying is provided,
   a content displayed by the at least one processor circuit is updated in a timely manner in response to an operation of the driver while displaying the content.

10. The traveling path providing system according to claim 1, wherein,
    in the traveling path providing system, the vehicle and an information processing device are communicably connected, the vehicle includes the at least one processor circuit to execute the acquiring and the providing, and
    the information processing device includes the at least one processor circuit to execute the determining and the specifying.

11. A method of controlling a traveling path providing system, comprising:
    determining driving skill of a driver of a vehicle, based on driving history of the driver;
    acquiring surroundings information including information of a road surface of a route on which the vehicle is currently traveling;
    specifying a plurality of paths each having different difficulty travelable by the driver on the road surface of the route, based on the surroundings information and the determined driving skill; and
    providing the plurality of paths each having different difficulty specified in the specifying by superposing the surroundings information in a view of the driver.

12. A non-transitory computer readable medium storing a program for causing a computer to function to:
    determine the driving skill of a driver of a vehicle, based on driving history of the driver;
    acquire surroundings information including information of a road surface of a route on which the vehicle is currently traveling;
    specify a plurality of paths each having different difficulty travelable by the driver on the road surface of the route, based on the surroundings information and the determined driving skill; and
    provide the plurality of paths each having different difficulty specified by superposing the surroundings information in a view of the driver.

* * * * *